United States Patent [19]

Sokolow

[11] 3,844,700

[45] Oct. 29, 1974

[54] METHOD AND APPARATUS FOR FORMING CONTINUOUS THERMOPLASTIC PIPE HAVING CORRUGATED SEGMENTS

[75] Inventor: Nickolas N. Sokolow, Roscoe, Ill.

[73] Assignee: Beloit Corporation, Beloit, Wis.

[22] Filed: Feb. 6, 1973

[21] Appl. No.: 330,002

[52] U.S. Cl. ......... 425/326 R, 425/387 R, 425/392, 425/393, 425/396
[51] Int. Cl. ..................... B29d 23/18, B29d 23/04
[58] Field of Search ............ 425/324 R, 324 B, 325, 425/326 R, 326 B, 405, 392, 393, 396, 387, 397, 384; 264/89, 98, 99, DIG. 52

[56] References Cited
UNITED STATES PATENTS

| | | | |
|---|---|---|---|
| 3,347,966 | 10/1967 | Seefluth | 425/324 X |
| 3,349,156 | 10/1967 | Zieg | 425/326 X |
| 3,664,790 | 5/1972 | Hollander | 425/131 |
| 3,677,676 | 7/1972 | Hegler | 425/326 R X |
| 3,705,779 | 12/1972 | Zon | 425/326 |
| 3,751,541 | 8/1973 | Hegler | 425/326 R X |

Primary Examiner—Andrew R. Juhasz
Assistant Examiner—David B. Smith
Attorney, Agent, or Firm—Parmelee, Miller, Welsh & Kratz

[57] ABSTRACT

An apparatus is detailed for forming continuous thermoplastic pipe which has spaced corrugated flexible wall portions along the length of the pipe. The pipe is extruded through a conventional extrusion die to produce pipe of the desired diameter and wall thickness. A portion of the continuously advanced pipe is heated to a desired plasticity and corrugated by engagement with corrugated mold means. The heating means and corrugating means are coordinated to move with the continuously extruded pipe.

9 Claims, 4 Drawing Figures

METHOD AND APPARATUS FOR FORMING CONTINUOUS THERMOPLASTIC PIPE HAVING CORRUGATED SEGMENTS

BACKGROUND OF THE INVENTION

The present invention relates to forming continuous lengths of thermoplastic pipe with spaced corrugated wall portions between rigid portions.

Thermoplastic pipe offers many practical advantages over galvanized, terra-cotta, or concrete pipe. The prime advantage is the generally non-corrosive nature of plastic pipe, particularly when it is used for conveying water. In laying pipe of any kind, the number of couplings which must be made will have a significant impact on the cost of the system. Recently, continuous corrugated plastic tubing has been produced which permits winding of the tubing or pipe on a spool for ease of transportation. The flexibility provided by the corrugated wall of such pipe permits avoidance of obstructions during laying of the pipe. The continuous corrugated pipe is expensive to fabricate since the corrugations run along the entire length of the pipe. The corrugations do offer some resistance to fluid flow within the pipe. Generally, the bends which must be made in laying the pipe do not require continuous corrugation and merely providing a discrete length of flexible corrugated section will provide the required flexibility.

SUMMARY OF THE INVENTION

An apparatus for forming continuous thermoplastic pipe which has spaced corrugated wall portions along the length of the pipe is detailed. The thermoplastic pipe is extruded conventionally to a predetermined diameter and wall thickness. Spaced portions of the extruded advancing pipe are heated to a formable plastic state and engaged by corrugation forming means to form the spaced discrete corrugated sections along the pipe length. The heating means and corrugating means are coordinated to the travel of the continuously advancing pipe, and are reciprocable along with the advancing pipe, and back again to an initial pipe engaging position for use with the succeeding portion of pipe to be corrugated. A method of stacking the formed pipe upon a storage and transporting platform is detailed, which permits long continuous lengths of pipe to be easily transported to the site at which the pipe is to be laid.

DESCRIPTION OF THE PREFERRED EMBODIMENT

Figure 1:
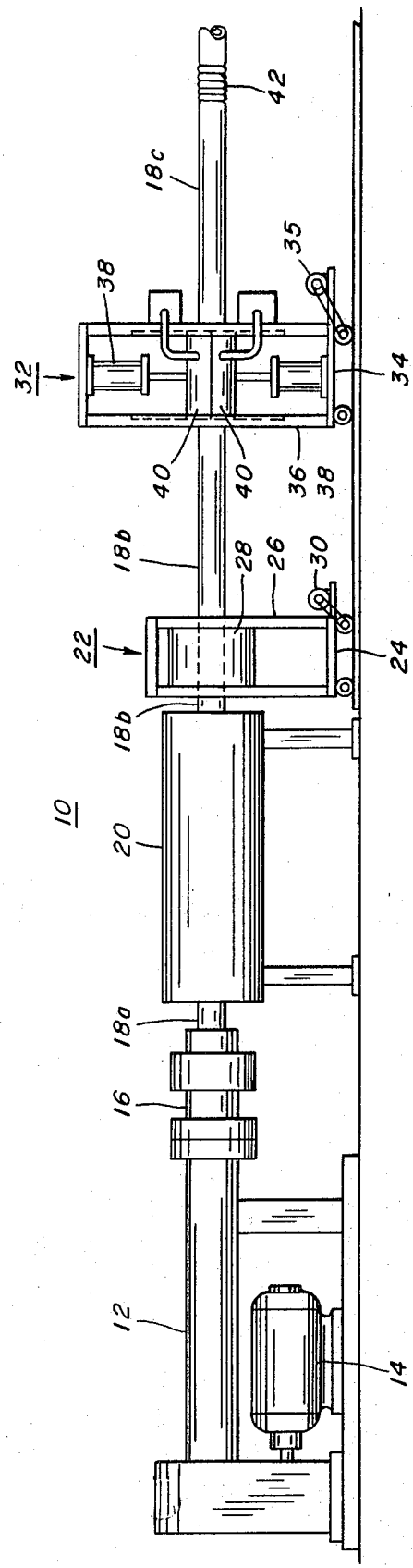
FIG. 1 is a side elevational view of one embodiment of the over-all system for practicing the present invention.
Figure 4:
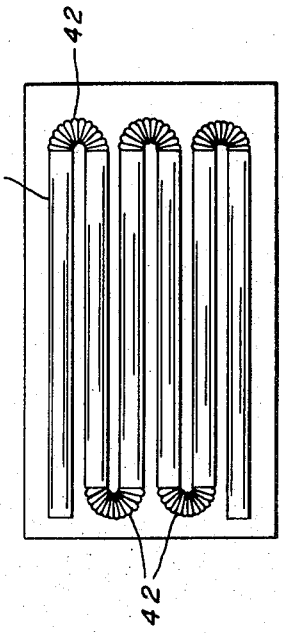
FIG. 4 is a plan view of a pipe transporting platform showing the pipe stacked thereon in an efficient mode which is easily loaded and unloaded.

The invention can be best understood by reference to the exemplary embodiment shown in the drawings. In FIG. 1, the thermoplastic pipe forming system 10 comprises an extruder means 12 for plasticizing the thermoplastic material, with operative drive means 14. The thermoplastic material is fed to extrusion die means 16, where the material is formed into a tubular configuration continuous pipe 18(a) which has the approximate diameter and wall thickness desired. The semiplastic pipe 18(a) is fed to a sizing apparatus 20, which is used to calibrate the outside diameter of the pipe. Such sizing means are well known in the art and employ either vacuum pressure applied to the outside of the pipe or higher than atmospheric pressure applied to the inside of the pipe to expand the pipe in the semi-plastic state against a sizing sleeve. Chilled water is then circulated around the pipe to set the uniform outside diameter.

The now sized pipe 18(b), which emerges from the apparatus 20 is relatively rigid due to the cooling effected by the sizing apparatus 20. In order to form the desired corrugations in the pipe wall, the pipe must be heated to achieve the desired plasticity at the selectively spaced portions.

A heating apparatus 22 is aligned with and disposed to receive the advancing sized pipe 18(b) and comprises a reciprocably movable carriage 24, which is movable along with the advancing pipe 18(b) and back to a starting point. Any suitable heating device may be utilized to reheat the selected portions of the pipe to a temperature sufficient to return those portions of the pipe to a semi-plastic state and permit corrugation of the pipe wall. The amount of heat required will depend upon the specific material being used and the diameter and wall thickness of the pipe. For light gauge pipe, an electric resistance heater in the form of an oversized ring 28 through which the pipe is freely movable can be mounted in a frame 26 supported by the carriage 24.

The heating apparatus 22 is shown in position in FIG. 1 for the start of a heating cycle. A discrete portion of the sized pipe 18(b) emerging from the sizing apparatus is surrounded by the electric heater ring 28. As the carriage 24 is advanced to the right, as seen in FIG. 1, at the same velocity as the advancing pipe by a motor 30 on the carriage 24, electric current from a power source (not shown) is applied to the heater ring 28. The selected portion of the pipe 18(b) is thereby heated to the semi-plastic state by the time that the advancing heater carriage 24 reaches the end of its travel path adjacent the starting position of the corrugating apparatus 32. The electric current is then removed from the heater ring 28 and the carriage 24 is reciprocated back to its starting position ready to advance with the next section of pipe which is to be heated prior to corrugation.

A corrugating apparatus 32 is aligned with the heating apparatus 22 and pipe 18(b). The corrugating apparatus 32 comprises a reciprocably movable carriage 34, supporting an upright frame 36, from which are supported fluid actuated cylinders 38 connected to mating corrugating mold units 40. The cylinders 38 reciprocably move the corrugating mold units 40 into mating relation about the pipe. The mold units 40 each comprise a vacuum manifold chamber having a corrugated wall interior surface formed of a permeable material. The mold units 40 are modified vacuum sizing units, with the provision of a corrugated permeable interior surface, and the provision of two separate movable mating units 40. The mating units permit engagement with the pipe for molding, and disengagement when the molding is completed.

The vacuum manifolds are connected to a vacuum source, not shown. The differential pressure between the partial vacuum on the exterior of the semi-plastic pipe and the atmospheric, or above-atmospheric, pressure inside the pipe results in expansion of the semi-plastic pipe into the corrugations of the permeable inner surface of the vacuum manifolds. The corrugations 42, formed in the now discretely corrugated pipe 18(c), are preferably annular about the pipe circumference. The number of corrugations and length of the corrugated portion are matters of choice and will largely depend on the degree of flexibility that is desired for the final product.

The corrugating apparatus of FIG. 1 is shown at a starting position adjacent the far right position reached by the heating apparatus in moving rightward where it receives the heated portion of the pipe. The cylinders 38 are actuated to move the mating corrugating mold units 40 toward the semiplastic centrally disposed continuously advancing pipe. As the mold units 40 approach the moving pipe, the carriage 34 is actuated by motor 35 to advance it to the right along with the advancing pipe at the same velocity as the pipe. When the mold units 40 are mated about the pipe, the vacuum system associated therewith is acutated to establish the pressure differential between the inside of the pipe and the outside needed to effect corrugated forming of the discrete section of the pipe. The carriage 34 comes to the end of its rightward travel and the mold units are disengaged from the corrugated pipe section. The carriage 34 is reciprocated back to its initial starting position ready to engage the next semi-plastic section which is to be corrugated.

When the thermoplastic pipe is heavy walled and of a large diameter, the approximately one atmosphere pressure differential between the inside and outside of the pipe may not be sufficient to effectuate formation of the corrugations. The embodiment shown in FIG. 2 can be utilized for forming such heavy-walled, larger diameter pipe.

In this embodiment, the extruder 44 feeds from a direction perpendicular to the direction in which formed pipe advances from the extrusion die member 46. A rigid elongated tube 48 is centrally mounted through the extrusion die member 46. The tube 48 is reciprocally mounted and is movable back and forth along the extruded pipe central axis. The forming extrusion chamber is concentric about the tube 48 which has an outside end portion 50 which is adapted to reciprocal drive means 51. The elongated tube 48 extends for some distance within the extruded formed pipe 18(a) which is again vacuum sized in sizing apparatus 52. A pulling means 54 is schematically shown at the sizing apparatus outlet. The pulling means 54 engages the exterior surface of the now semi-rigid pipe 18(b) and exerts a force on the pipe which assists the extrusion means in advancing the pipe to the right. Such pulling means are well known in the art and generally comprise a pair of endless belts which are rotated in opposed direction and are closely spaced to accept and frictionally engage the pipe therebetween. If desired, the speed of the puller can be increased above that of the extruder so that the extruded pipe will be stretched. While this stretching thins the pipe side walls somewhat, it is well known that it results in a stronger product through molecular alignment of the extruded material. This stretching takes place in that portion of the pipe within the sizing sleeve. By coordinating the speed of the puller with that of the corrugating means, the selected portions of the pipe to be corrugated may be strengthened.

Figure 2:
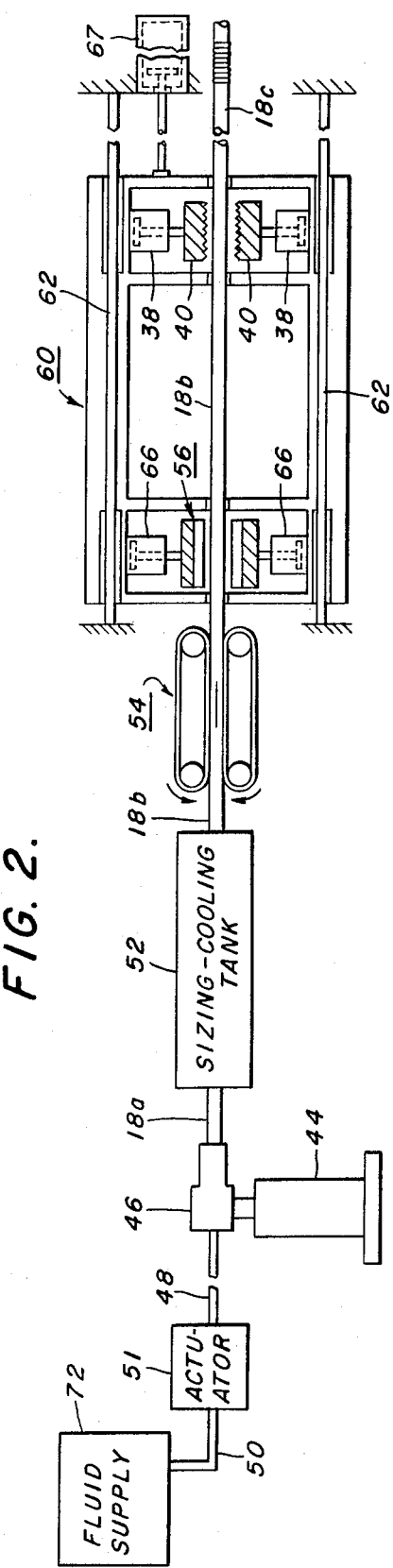
FIG. 2 is a schematic representation of another embodiment of the system of the present invention.

The corrugation of discrete sections of the pipe in FIG. 2 is carried out by a modified apparatus. In this embodiment, a heating means 56 and corrugation molding means 58 are mounted in a common carriage 60 for reciprocation on guide rails 62. In order to apply the heat required to the heavy walled large diameter pipe 18(b), mating half-cylinder shaped contact heating elements 64 are moved into mating position around the pipe by fluid actuated cylinders 66. The corrugation molding means 58 is similar to that described in connection with FIG. 1 with cylinders 66 moving corrugating mold units 40 into mating relationship around the pipe. The carriage 60 supporting the heater means 56 and the corrugation molding means 58 is advanced to the right in FIG. 2 at the same speed as the pipe by fluid cylinder 67. As the carriage approaches the far right position, the heater units and mold units are opened and the carriage 60 is returned to the starting position by cylinder 67.

Figure 3:
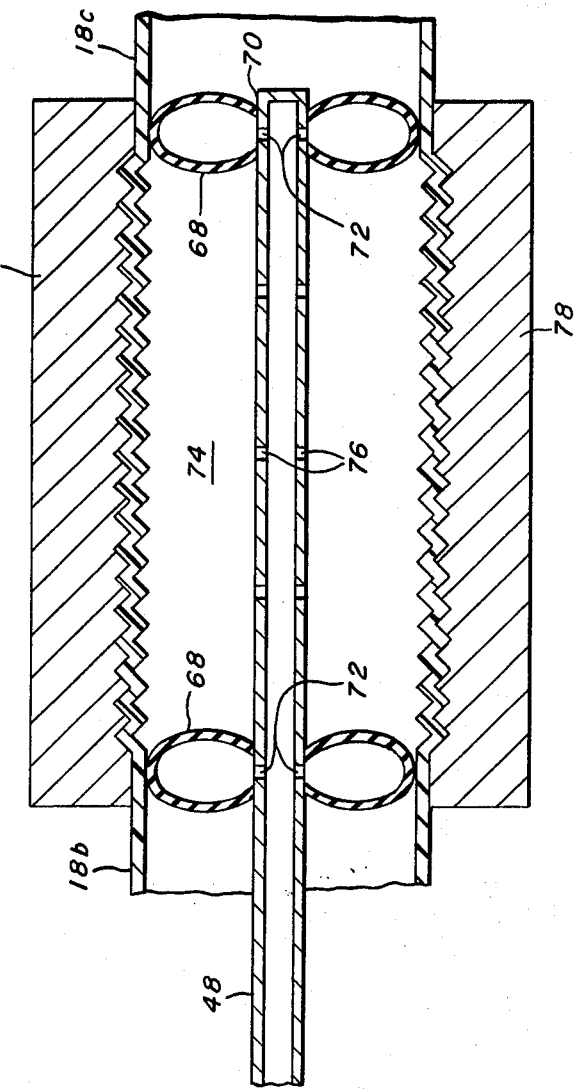
FIG. 3 is an enlarged view of the pipe corrugating portion of a specific embodiment of the present invention.

In order to apply above-atmospheric pressure to the interior of the thicker walled pipe during corrugation, a pair of spaced collar means 68 are mounted near the terminal end 70 of the tube 48 which extends into the pipe as shown in FIG. 3. The collar means 68 comprises resilient expandable annular seals. The interior of the tube 48 communicates with the interior of the collar means 68 via apertures 72.

The tube 48 at external end 50 is adapted to a source of pressurized gas 72 to inflate and expand the collar means 68 against the interior wall of the pipe to define a pressure chamber 74 between the collar means 68 inside pipe 18(b). A plurality of apertures 76 are provided through the tube 48 between the collar means 68 to permit pressurization of the pressure chamber 74 which forces the heated semi-plastic pipe wall into the corrugated mated mold portions 78 which are disposed about the pipe and advanced with the pipe. Upon deformation of the pipe into the corrugated mold and hardening of the corrugated pipe section, the mold halves and heater halves are opened to permit the return of the carriage 60 to the starting position. The pressure within the pipe and within the expandable collar means is relieved to permit reciprocation back of the tube 48. The reciprocation of the tube 48 within the pipe is coordinated with the reciprocation of the corrugating mold outside the pipe. The relative positions of the collar means within the plastic pipe always coincide with the corrugated mold portions outside the pipe.

The continuous length of pipe formed according to the present invention, with alternating elongated smooth walled portions and relatively short discrete corrugated portions, is readily stored and transported as another aspect of the present invention. A substantial length of the pipe can be stored and transported on a railway car or truck, each of which comprises a generally rectangular platform. The pipe is deposited upon the platform in generally sinuous fashion. The initial elongated smooth walled section is deposited parallel to one edge of the generally rectangular platform. The length of this pipe section is generally equal to the length of the platform. The flexible corrugated pipe section is bent back 180° in the same horizontal plane in which the initial section is disposed, and the next elongated smooth walled section is deposited parallel and next to the already deposited section. This sinuous depositing pattern is continued to fill the platform with the flexible pipe section, which completes coverage of the platform in a given horizontal plane, being bent upward as well as back to permit the next elongated smooth walled section to be deposited on top of the already deposited section. The sinuous depositing is continued to fully load the platform with pipe. It should be apparent that this loading and storage pattern also facilitates easy unloading of the pipe on site for use. A significant continuous length of pipe eliminates the need for making numerous junctions or unions in the field.

I claim:

1. Apparatus for forming continuous thermoplastic pipe which has spaced corrugated wall portions along the length of the pipe comprising:
   a. continuous pipe forming means for forming pipe of a predetermined diameter and wall thickness and for cooling the formed pipe;
   b. heating means for selectively heating spaced portions of the formed pipe after it leaves the pipe forming means;
   c. corrugation forming means for engaging the heated spaced portions of the continuously advancing pipe, and forming discrete corrugated sections; and
   d. coordinating means for coordinating movement of the heating means and corrugation forming means to the travel of the pipe including means for moving the heating and corrugating means with the continuously advancing pipe.

2. The apparatus specified in claim 1, wherein the heating means comprises a ring shaped heater freely slidable axially along the formed pipe and wherein said coordinating means includes means for advancing the heating means with the advancing pipe and for selectively moving the heating means along the advancing pipe in the direction opposite that of the advancing pipe.

3. The apparatus specified in claim 1, wherein the heating means comprises generally half-cylinder shaped mating portions which are reciprocally movable together into mating relationship about the pipe, and movable away from the pipe and wherein the coordinating means includes means for advancing the heating means in synchronism with the advancing pipe when the mating portions are in mating relationship about the pipe and for selectively moving the heating means along the advancing pipe in the direction opposite to that of the advancing pipe when the mating portions are moved away from said pipe.

4. The apparatus specified in claim 1, wherein the corrugation forming means comprises mating mold portions which are reciprocally movable into mating relationship about the pipe, and away from the pipe and wherein said coordinating means includes means for advancing the corrugation forming means with the advancing pipe when the mating mold portions are in mating relationship about the pipe and for selectively moving the corrugation forming means in the direction opposite to that of the advancing pipe when the mating mold portions are moved away from the pipe.

5. The apparatus specified in claim 4, wherein the mating mold portions have a corrugated interior wall surface, and wherein the mating mold portions include a vacuum manifold with the corrugated interior wall being permeable whereby the pipe can be formed against the corrugated interior wall as a result of maintaining a partial vacuum in the manifold and on the exterior of the pipe.

6. The apparatus specified in claim 1, wherein the heating means and corrugation forming means are reciprocably mounted and movable on elongated support rods which extend parallel to the direction of pipe travel.

7. The apparatus specified in claim 1, wherein the coordinating means includes a common carriage on which the heating means and the corrugation forming means are mounted and which is movable in synchronism with the advancing pipe, said heating means and corrugation forming means being spaced apart on said carriage in the direction of pipe movement a distance corresponding to the desired distance between corrugations.

8. The apparatus as specified in claim 1 including sizing means for calibrating the diameter of the formed pipe and puller means for aiding in passing the formed pipe through the sizing means being disposed successively between said continuous pipe forming means and said heating means, said puller means being selectively operative to pull those portions of the pipe to be corrugated at a speed faster than the speed at which the formed pipe leaves the pipe forming means to stretch those selected portions of the pipe, whereby the selected portions of the pipe to be corrugated are strengthened through the molecular alignment of the thermoplastic resulting from the stretching.

9. The apparatus specified in claim 1, including a reciprocally movable elongated rigid tube extending through the pipe forming means along the central axis of the formed pipe, a source of pressurized gas for selectively pressurizing said tube, a pair of inflatable collars axially spaced along the rigid tube inside the pipe on either side of externally disposed corrugation forming means, said collars being inflatable by the pressurized gas in the tube through first apertures in the tube walls to engage the interior walls of the formed pipe and to thereby define a pressure chamber within the formed pipe between said inflatable collars, additional apertures in the rigid tube between the collar means to permit pressurization of the pressure chamber by the pressurized gas in the tube and thereby press the pipe wall intermediate said inflatable collars against the externally disposed corrugation forming means, and reciprocation means for advancing the rigid tube along the axis of the pipe to maintain said pressure chamber in alignment with the corrugation forming means as it advances with the formed pipe.

* * * * *